No. 869,905.
PATENTED NOV. 5, 1907.
L. A. HOLDEN.
GATE HINGE.
APPLICATION FILED APR. 29, 1907.
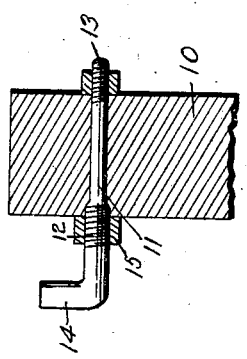
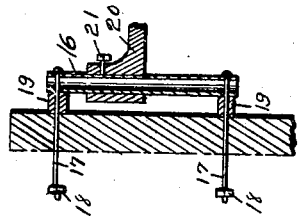
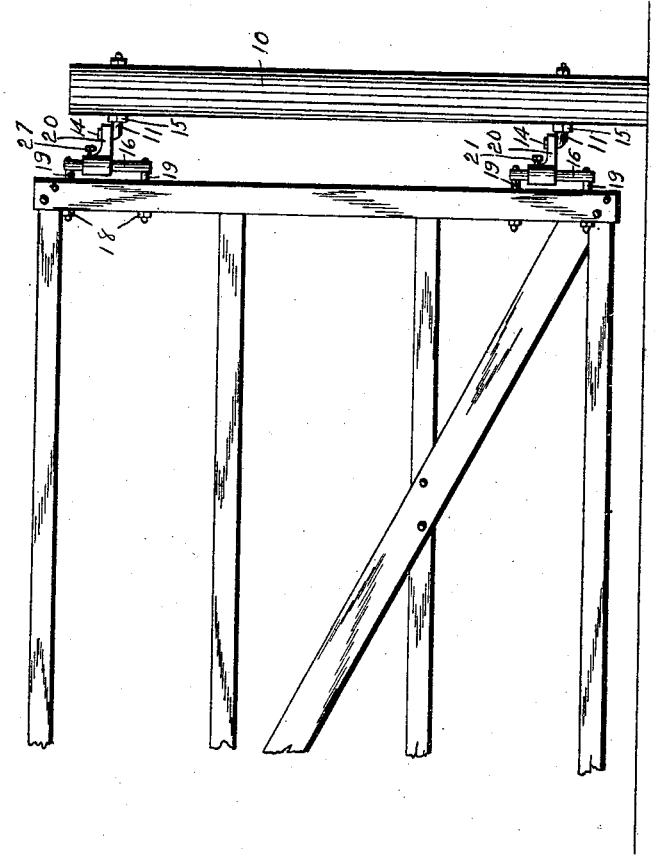
Witnesses.
F. C. Dahlberg.
M. E. Bennett.
Inventor.
L. A. Holden.
by Ourig & Lane Attys.

UNITED STATES PATENT OFFICE.

LENHARD A. HOLDEN, OF OTTOSEN, IOWA.

GATE-HINGE.

No. 869,905.  Specification of Letters Patent.  Patented Nov. 5, 1907.

Application filed April 29, 1907. Serial No. 370,759.

*To all whom it may concern:*

Be it known that I, LENHARD A. HOLDEN, a citizen of the United States, residing at Ottosen, in the county of Humbolt and State of Iowa, have invented a certain new and useful Gate-Hinge, of which the following is a specification.

The object of my invention is to provide a gate hinge of simple, durable and inexpensive construction, that may be quickly and easily made out of inexpensive materials, and that will permit the gate to freely swing in both directions, and will also permit the gate to be quickly and easily adjusted up and down relative to the ground surface so that in case snow or other obstruction is lying upon the ground surface, it may be adjusted to swing over it.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a gate and post provided with my improved hinge. Fig. 2 shows a sectional view through a post with the hinge supporting bolt therein, and Fig. 3 shows a detail sectional view through a part of the gate and the hinge member that is connected with the gate.

Referring to the accompanying drawings, I have used the reference numeral 10 to indicate a gate post of ordinary construction. The hinge member that is connected to the gate post comprises a bolt 11, having a screw threaded portion 12, and also a screw threaded portion 13, said screw threaded portion designed to stand on opposite sides of the post when the bolt is passed through the post. Adjacent to the screw threaded portion 12, the bolt is extended upwardly to form a journal 14, two nuts 15 are placed on the screw threaded portions of the bolt for locking the bolt against movement in either direction relative to the post. By this means when there are two hinges connected with the post they may be so adjusted by manipulating the nuts 15 that the gate may be made to stand vertical, or to tilt upwardly or inwardly at its upper end, as may be desired, and this may be done simply with the use of a wrench, and without disconnecting any of the parts of the hinge or the gate.

The hinged member that is connected to the gate comprises a straight tube or rod 16, having two bolts 17 passed through its ends, and designed to extend through a part of the gate, the nuts 18 being placed on the ends of said bolts. This tube or rod 16 is held spaced apart from the gate by means of blocks 19, through which said bolts 17 are passed. Adjustably mounted upon the tube or rod 16 is a bracket 20, having a vertical opening to receive the tube or rod, and also having a vertical opening designed to receive the journal 14. I provide for adjustably securing the bracket 20 to the tube or rod 16 by means of a set screw 21, passed through the bracket to engage the tube or rod.

In practical use, it is obvious that a gate may be quickly and easily hung upon the hinges and adjusted to such position that it will either hang perfectly true, or be inclined in any way desired. If it is desired to have the top of the gate incline away from the top of the post, this may be done by manipulating the nuts 15 of the upper bolt, or if it is desired to have the top incline to one side or the other, this may be done by turning the bracket 20 on the tube or rod 16, and then tightening the set screw 21, or if it is desired to have a gate either raised or lowered bodily, this may be done by loosening the set screws 21, and then raising or lowering the gate, and securing it in its adjusted position.

Having thus described my invention, what I claim and desire to secure by Letters Patent of the United States, therefor, is

An improved gate hinge, comprising a hinged member having a bolt with two screw threaded portions thereon, nuts on said screw threaded portions designed to engage opposite sides of a post, and an upwardly projecting journal on the bolt, and a second hinged member comprising a rod, bolts extended through its ends, spacing blocks on said bolts, and a bracket having a circular opening to receive the rod, and a lateral extension to receive said journal, and a set screw seated in the bracket to engage the rod.

Des Moines, Iowa, April 13, 1907.

LENHARD A. HOLDEN.

Witnesses:
 C. O. NORDLIE,
 A. P. HOLDEN.